United States Patent [19]

Weissert

[11] Patent Number: 4,805,986
[45] Date of Patent: Feb. 21, 1989

[54] METHOD OF PRODUCING POLARIZATION-MAINTAINING SINGLE-MODE OPTICAL WAVEGUIDES AND PREFORMS USED THEREIN

[75] Inventor: Herbert Weissert, Asperg, Fed. Rep. of Germany

[73] Assignee: Standard Elektrik Lorenz AG, Stuttgart, Fed. Rep. of Germany

[21] Appl. No.: 76,149

[22] Filed: Jul. 21, 1987

[30] Foreign Application Priority Data

Jul. 24, 1986 [DE] Fed. Rep. of Germany ....... 3625002

[51] Int. Cl.$^4$ .......................... C03B 37/12; G02B 6/10
[52] U.S. Cl. .................................. 350/96.30; 65/3.11; 350/96.32
[58] Field of Search ............... 350/96.29, 96.30, 96.32, 350/96.33; 65/3.11, 3.12

[56] References Cited

U.S. PATENT DOCUMENTS 3,535,017 10/1970 Miller ............................... 350/96.30
4,395,270 7/1983 Blankenship ......................... 65/3.12

Primary Examiner—Kenneth M. Schor
Attorney, Agent, or Firm—Peter C. Van Der Sluys

[57] ABSTRACT

A method of producing polarization-maintaining single-mode optical waveguides is provided wherein the preform from which the optical waveguide is produced consists of a tube, a rod of core and cladding material centrally disposed in said tube, and two differently doped pairs of filler rods disposed about said rod, the two rods of each pair being disposed diametrically opposed to each other with respect to said rod. Maximum polarization maintenance of the optical waveguide being produced is achieved by choosing the diameter ratios so that each filler rod rests against the central rod, against the inside wall of the tube, and directly against the two filler rods of the respective other pair.

11 Claims, 1 Drawing Sheet

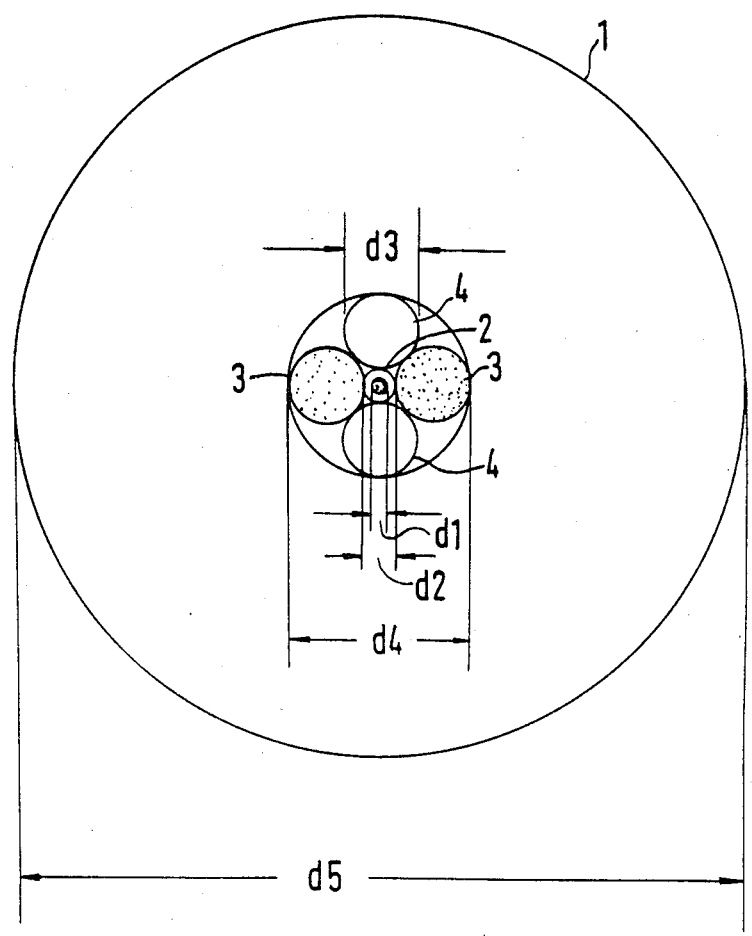

METHOD OF PRODUCING POLARIZATION-MAINTAINING SINGLE-MODE OPTICAL WAVEGUIDES AND PREFORMS USED THEREIN

BACKGROUND OF THE INVENTION

1. Field of the Invention

The present invention relates to a method of producing an optical waveguide and more particularly to a method of producing a polarization-maintaining single-mode optical waveguide and a preform used therein.

2. Description of the Prior Art

A method for producing such a waveguide is disclosed in European patent application No. 0 145 031. In this known method, a preform is provided wherein the ratios between the inside diameter of a tube of cladding material, the outside diameter of a rod centrally disposed therein, and the diameters of four rods arranged in between are so chosen that a large interstice remains between one rod and the next rod located in the circumferential direction of the inside circumference of the tube. Rods of cladding material are fitted into these interstices.

SUMMARY OF THE INVENTION

It is an object of the invention to provide a method of producing single-mode optical waveguides with improved polarization maintenance.

This object is achieved by providing a preform wherein, a central rod consisting of a core and cladding is disposed centrally in a tube of cladding material. The rods of a first pair of filler rods have a first composition and are disposed alternately about said central rod with respect to the rods of a second pair of filler rods having a second composition. The two rods of each pair of filler rods are disposed diametrically opposed to each other with respect to the central rod. The filler rods rest both against the central rod and against the inside wall of the tube. The diameter ratios between the central rod, the interior space of the tube, and the filler rods are chosen so that each of the four rods rests against the two filler rods of the other pair. The optical waveguide is drawn from this preform in a known manner.

DESCRIPTION OF THE DRAWING

The drawing shows a cross section of a preform used in the method in accordance with the invention.

DETAILED DESCRIPTION OF THE PREFERRED EMBODIMENT

In a glass tube 1 of $SiO_2$, the cladding material of the optical waveguide to be produced, whose outside and inside diameters are designated d5 and d4, respectively, a rod 2 is disposed at the center, i.e., exactly coaxially with the longitudinal axis of the tube 1. This rod generally consists of a central area of core material for the optical waveguide to be produced, and, surrounding the central area, a cladding area of cladding material for the optical waveguide to be produced. The diameter of the core area is designated d1 and the diameter of the cladding area, i.e., the outside diameter of the rod 2, is designated d2.

This rod can be produced in a known manner by coating the inside of a tube of cladding material with a core material and subsequently collapsing the tube. If necessary, the preform may be drawn to a desired diameter. It may be possible to use a homogeneously doped rod instead of a rod with a core and a cladding area, so that d1 = d2.

The space between the centrally disposed rod 2 and the inside wall of the tube 1 is filled with four filler rods, two filler rods opposed diametrically with respect to the central rod forming a pair because they have the same composition. As in the known preform described above, the one pair of filler rods bearing the reference numeral 3 is doped so as to differ considerably with respect to its thermal coefficient of expansion from the second pair of filler rods bearing the reference number 4. For example, the filler rods 3 are doped so as to have a higher thermal coefficient of expansion than undoped $SiO_2$, and the filler rods 4 are of undoped $SiO_2$. Doping can also be so chosen that the filler rods 3 have a high thermal coefficient of expansion, and the filler rods of 4 have a low, or negative, thermal coefficient of expansion by comparison to the undoped cladding material.

In contrast to the known method described above, the filler rods do not only rest against the inside wall of the tube and the central rod, but also directly against the filler rods forming the respective other pair, without additional rods being disposed in the interstices as in the case of the known preform. If the uniform diameter of the four filler rods is designated d3, it can be shown by simple geometric calculations that the outside diameter of the central rod d2, the outside diameter of the filler rods d3 and the inside diameter d4 of the tube 1 have the following relationships to each other:

$$d2 = d3\,(\sqrt{2} - 1)$$

$$d4 = d3\,(1 + \sqrt{2}).$$

If the diameters have these relationships, the filler rods fill the space between the central rod 2 and the inside wall of the tube 1 as shown in the drawing.

This arrangement of filler rods in accordance with the invention ensures that the effect of stress-induced birefringence is maximized, so that a method of producing optical waveguides in which the optical waveguide is drawn from such a preform results in the physically optimum polarization maintenance.

The described arrangement, in which the rods introduced into the tube are fused to the upper end of the tube 1 to prevent them from falling out at the lower end, is a preform from which the polarization-maintaining single-mode optical waveguide can be drawn directly without previous collapsing. The ratio d1:d2 of ≦1, together with the difference in doping of the two pairs of filler rods, determines the magnitude of the mechanical stress in the core of the optical waveguide being produced, and thus the "quality" of polarization maintenance. The ratio d1 : d5 is determined by the generally standardized outside diameter of the optical waveguide and the desired core diameter.

What is claimed is:

1. A method of producing an optical waveguide preform, comprising the step of:

assembling a preform comprising a tube of cladding material, a rod having a core and a cladding disposed centrally in said tube, a first pair of filler rods having a first composition, a second pair of filler rods having a second composition, the tow rods of each pair being disposed diametrically opposed to each other with respect to the central rod, all of the filler rods being of equal diameter and resting both against the central rod and against the inside wall of the tube, the diameters of the central rod, the inside wall of the tube, and the filler rods are so chosen that each of the filler rods also rests against the two filler rods of the other pair.

2. A method as described in claim 1, additionally comprising the steps of drawing an optical waveguide from said preform.

3. A method as described in claim 1, additionally comprising the steps of fusing said rods and said tube at one end to prevent disassembly.

4. A method as described in claim 1, wherein the first composition is selected to have a higher thermal coefficient of expansion than the second composition.

5. A method as described in claim 1, wherein the tube is formed of $SiO_2$ and the first composition is selected to have a thermal coefficient of expansion higher than $SiO_2$ and the second composition is selected to have a thermal coefficient of expansion equal to or lower than $SiO_2$.

6. A method as described in claim 1, wherein the diameter d2 of the central rod, the diameter d3 of the filler rods, and the diameter d4 of the inside of the tube are selected to have the following relationships:

$$d2 = d3 (\sqrt{2} - 1)$$

$$d4 = d3 (1 + \sqrt{2})$$

7. A preform for an optical waveguide comprising:
a tube of cladding material;
a central rod having a core and a cladding, said rod disposed centrally in said tube;
a first pair of filler rods having a first composition;
a second pair of filler rods having a second composition, the two rods of each pair being disposed diametrically opposed to each other with respect to the central rod, all of the filler rods being of equal diameter and resting both against the central rod and against the inside wall of the tube, the diameters of the central rod, the inside wall of the tube and the filler rods are chosen such that each of the filler rods also rests against the two filler rods of the other pair.

8. A preform as described in claim 7, wherein the rods and tube are fused at one end.

9. A preform as described in claim 7, wherein the first composition has a higher thermal coefficient of expansion than the second composition.

10. A preform as described in claim 7, wherein the tube is formed of $SiO_2$ and the first composition has a thermal coefficient of expansion higher than $SiO_2$ and the second composition has a thermal coefficient of expansion equal to or lower than $SiO_2$.

11. A preform as described in claim 7, wherein the diameter d2 of the central rod, the diameter d3 of the filler rods, and the diameter d4 of the inside wall of the tube have the following relationships:

$$d2 = d3 (\sqrt{2} - 1)$$

$$d4 = d3 (1 + \sqrt{2}).$$

* * * * *